(12) United States Patent
Büchel

(10) Patent No.: US 6,334,289 B1
(45) Date of Patent: Jan. 1, 2002

(54) CONVEYOR FOR BOTTLES WITH A MOUTH-COLLAR

(75) Inventor: Hans Büchel, Vaduz (LI)

(73) Assignee: Tetra Pak Plastics Limited, Geneva (CH)

( * ) Notice: Subject to any disclaimer, the term of this patent is extended or adjusted under 35 U.S.C. 154(b) by 0 days.

(21) Appl. No.: 09/787,529

(22) PCT Filed: Sep. 13, 1999

(86) PCT No.: PCT/EP99/06773

§ 371 Date: Mar. 20, 2001

§ 102(e) Date: Mar. 20, 2001

(87) PCT Pub. No.: WO00/17089

PCT Pub. Date: Mar. 30, 2000

(30) Foreign Application Priority Data

Sep. 21, 1998 (EP) .................................................. 98810943

(51) Int. Cl.⁷ ..................................................... B65B 41/04
(52) U.S. Cl. ................................................. 53/201; 53/300
(58) Field of Search ............................. 53/201, 249, 250, 53/253, 272, 273, 300, 471

(56) References Cited

U.S. PATENT DOCUMENTS

| | | | |
|---|---|---|---|
| 3,882,660 A | * 5/1975 | Sterling | 53/308 |
| 3,987,535 A | * 10/1976 | Brown | 29/427 |
| 3,998,032 A | * 12/1976 | Koebbeman | 53/352 |
| 4,205,502 A | * 6/1980 | Ahlers | 53/308 |
| 4,466,548 A | * 8/1984 | Herbert | 215/307 |
| 4,562,685 A | * 1/1986 | Tomita et al. | 53/201 |
| 5,408,801 A | * 4/1995 | Molinaro | 53/300 |
| 5,689,932 A | * 11/1997 | Peronek et al. | 53/201 |
| 5,778,633 A | * 7/1998 | Sweeny | 53/201 |

FOREIGN PATENT DOCUMENTS

| | | |
|---|---|---|
| DE | 25 41 611 A1 | 3/1977 |
| DE | 42 37 234 C1 | 4/1994 |

\* cited by examiner

*Primary Examiner*—Peter Vo
*Assistant Examiner*—Nathaniel Chukwurah
(74) *Attorney, Agent, or Firm*—Browdy and Neimark

(57) ABSTRACT

A tool designed to grip a collar projecting from the mouth of a plastic bottle, comprises a main body which is made of stainless steel and has three inserts made of hardened steel attached by means of silver brazing. The body has an internal edge in the form of an arc of a circle that is designed to surround part of the mouth of the bottle. Each insert carries a pointed projection which extends upwards. The projections, which define a horizontal support plane on which the collar is designed to rest, are particularly resistant to wear. The tool is used especially in bottling machines in order to allow the bottles to be gripped and handled.

7 Claims, 1 Drawing Sheet

CONVEYOR FOR BOTTLES WITH A MOUTH-COLLAR

BACKGROUND OF THE INVENTION

1. Technical Field of the Invention

The subject of the present invention is a tool for gripping a collar formed integrally with the mouth of a plastic bottle.

More specifically, but not exclusively, the tool can be usefully applied in bottling machines in order to allow the bottles to be gripped and handled.

Reference is made in particular to a tool comprising a flat body having an edge which is essentially in the form of an arc of a circle with a diameter between the diameter of the mouth and that of the collar. The body is designed to surround part of the mouth of the bottle with its circular edge. Located on an upper surface of the body, close to its edge, there are at least three pointed projections which extend upwards and define a horizontal support plane on which the collar is designed to rest.

2. Prior Art

A tool of this type is already known in which the pointed projections, which perform the function of securely gripping the collar on the neck of the bottle, are made as one piece with the main body of the tool.

In known tools the pointed top end of the projections is subject to wear, with a consequent reduction in the firmness with which the collar is gripped. This means that the worn tool needs to be replaced fairly frequently with a new tool. This disadvantage is compounded in aseptic bottling machines where the tools that grip the bottles are generally made of stainless steel, a material notorious for its poor resistance to wear. Each time the tools need to be replaced, the bottling line has to be stopped for a considerable period of time, resulting in a significant increase in production costs.

OBJECT AND SUMMARY OF INVENTION

The object of the present invention is to overcome the abovementioned limitations and drawbacks of the known art by means or a gripping tool that can be reliably used for long periods of time without having to be replaced, even when employed in an aseptic bottling environment.

One advantage of the invention in question is that it provides a tool that is simple and cheap to construct.

A further advantage is that it makes available a tool that does not have any small recesses, cracks, gaps or the like in which perishable material could get trapped and stagnate giving rise to the growth of bacteria. The tool in question can therefore be used for filling plastic bottles under aseptic conditions without the risk of contaminating the bottled product with bacteria.

These objects and advantages, together with others, are all achieved by the invention in question, as characterized by the claims set out below.

BRIEF DESCRIPTION OF THE DRAWINGS

Further features and advantages of the present invention will become clear in the following detailed description of a preferred embodiment of the invention in question, illustrated by way of non-limiting example in the appended figures.

DETAILED DESCRIPTION OF THE PREFERRED EMBODIMENT(S) OF THE INVENTION

Figure 1:
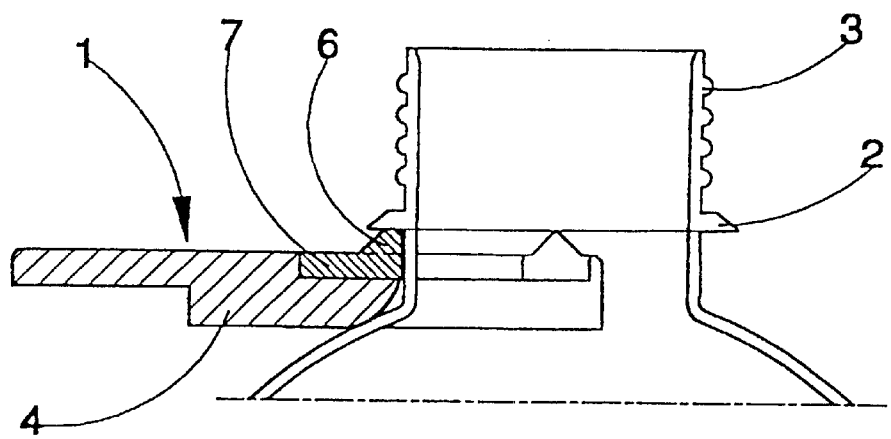
FIG. 1 shows a longitudinal section of the tool of the invention applied to the mouth of a plastic bottle.
Figure 2:
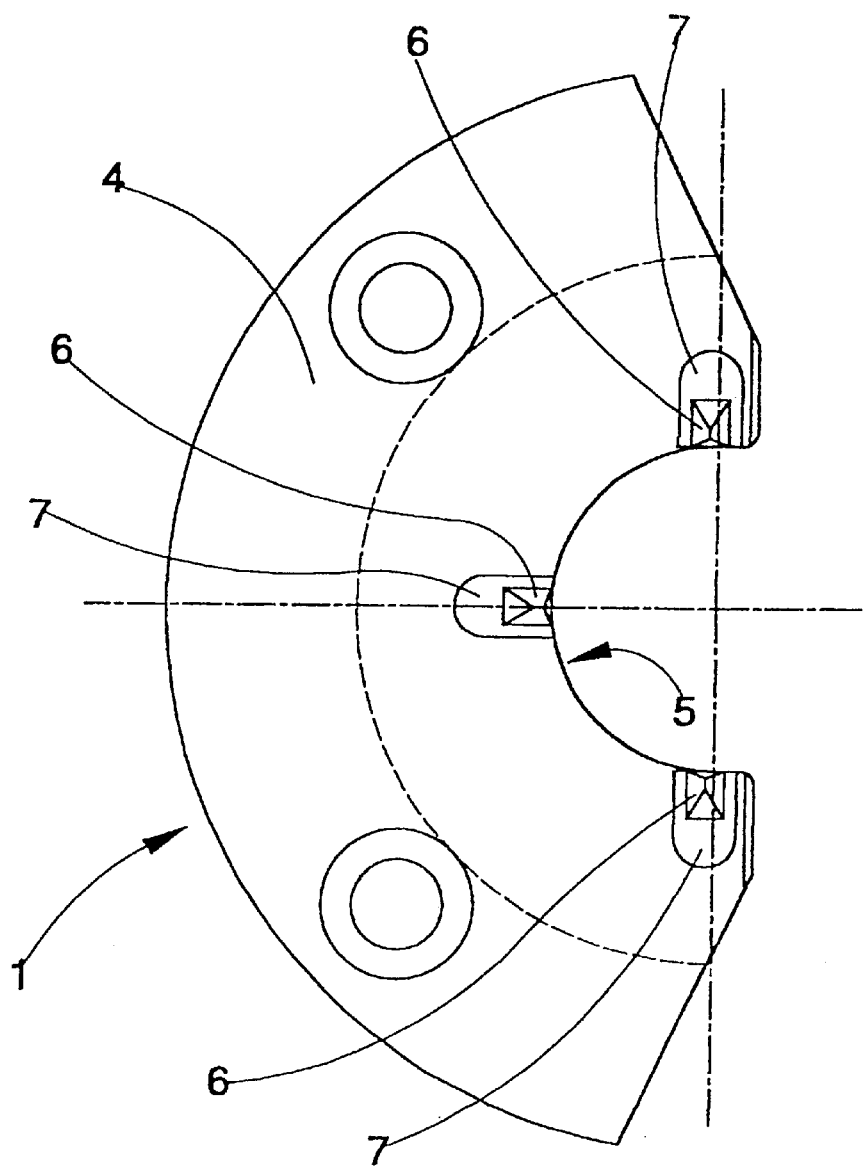
FIG. 2 shows a plan view of the tool in FIG. 1 (without the abovementioned bottle).

With reference to the abovementioned figures, the numeral 1 denotes, as a whole, a tool for gripping a collar 2 formed integrally with the mouth 3 of a plastic bottle.

The tool 1 forms part of a known plastic bottle feed line, installed within a bottling plant. The feed line comprises a plurality of gripping tools 1, each of which can engage with a collar 2 on a plastic bottle.

The bottling plant can, for example, comprise a filling machine of the rotary carousel type, known per se and not illustrated, fitted with a plurality of dispensing nozzles arranged around the circumference of the carousel and rotating integrally with the latter. Each tool 1 is designed to grip a corresponding bottle and locate it beneath a dispensing nozzle so that it can be filled as the carousel moves round.

The tool 1 comprises a flat main body 4 made of stainless steel which is essentially in the form of an arc of an annulus. The main body 4 has an internal edge 5 in the form of an arc of a circle with a diameter between the diameter of the mouth 3 and that of the collar 2. During use, the body 4 is designed to surround part of the mouth 3 of the bottle with its internal edge 5.

Located on the flat upper surface of the body 4, close to its internal edge 5, there are three pointed projections 6 which extend upwards and are spaced 90 degrees apart. The top ends of the projections 6 define a horizontal support plane on which the collar 2 is designed to rest.

Each of the pointed projections 6 is located on a corresponding insert 7. Each insert 7 is positioned in a corresponding cavity formed in the main body 4 and is made of a different material from that of the said body. In this particular case, where the tool 1 is being used within an aseptic bottling machine, the inserts 7 are made of hardened steel. Each insert 7 is attached to the main body 4 by means of silver brazing. This is done so as not to have any small recesses, cracks, gaps or the like in which perishable material—such as for example the product being poured into the bottles—could become embedded and stagnate. This ensures that bacteria cannot colonize the tool 1 and then contaminate the bottled product.

According to another embodiment of the invention which has not been illustrated, it is also possible to have a single insert, in the form of a semicircular strip, which carries all the pointed projections.

Each insert 7 can be applied in its cavity so that it can be removed, for example by press-fitting it or by using grooved tracks or other detachable fixing systems.

The inserts can, for example, be made of a relatively hard plastic, especially when the bottling process does not take place under aseptic conditions.

The invention may undergo numerous modifications of a practical nature, dependent on constructional details, without thereby departing from the scope of protection of the inventive concept claimed below.

What is claimed is:

1. Tool (1) for gripping a collar (2) projecting from the mouth (3) of a plastic bottle, comprising a main body (4) having an internal edge (5) which is essentially in a form of an arc of a circle having a diameter larger than a diameter of the mouth and less than a diameter of the collar, the edge (5)

of the main body (4) being designed to surround part of the mouth (3) of the bottle;

at least three pointed projections (6) located on an upper side of the main body (4) close to the edge (5) and extending upwards, top ends of the projections lying in a plane on which the collar (2) is designed to rest;

wherein the projections (6) are made of a different material from that of the main body (4) and are located in one or more inserts (7) applied in corresponding cavities formed in the body.

2. Tool according to claim 1, wherein each projection (6) is located on a corresponding insert (7).

3. Tool according to claim 1, wherein the tool comprises a single insert carrying the projections.

4. Tool according to claim 1, wherein each insert is applied in a cavity so that it can be removed.

5. Tool according to claim 1, wherein each insert (7) is attached to the main body (4) by means of silver brazing.

6. Tool according to claim 1, wherein each insert (7) is made of hardened steel.

7. Tool according to claim 1 wherein the inserts are made of plastic.

* * * * *